(12) United States Patent
Hertz et al.

(10) Patent No.: US 10,253,742 B2
(45) Date of Patent: Apr. 9, 2019

(54) MOTOR STARTER

(71) Applicant: Siemens Aktiengesellschaft, Munich (DE)

(72) Inventors: Dirk Hertz, Fichtenhof (DE); Stephan Jonas, Neunberg (DE); Johann Seitz, Amberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 205 days.

(21) Appl. No.: 14/420,723

(22) PCT Filed: Aug. 6, 2013

(86) PCT No.: PCT/EP2013/066462
§ 371 (c)(1),
(2) Date: Feb. 10, 2015

(87) PCT Pub. No.: WO2014/029614
PCT Pub. Date: Feb. 27, 2014

(65) Prior Publication Data
US 2015/0300305 A1 Oct. 22, 2015

(30) Foreign Application Priority Data
Aug. 21, 2012 (DE) .................. 10 2012 214 814

(51) Int. Cl.
*H01M 10/30* (2006.01)
*H02P 1/26* (2006.01)
(Continued)

(52) U.S. Cl.
CPC .............. *F02N 11/087* (2013.01); *H02P 1/26* (2013.01); *H01M 10/30* (2013.01); *H02P 21/20* (2016.02)

(58) Field of Classification Search
CPC .................. H02M 3/158; H02M 3/28
See application file for complete search history.

(56) References Cited

U.S. PATENT DOCUMENTS 4,142,136 A * 2/1979 Witter .................. H02P 1/28
318/779
5,953,189 A * 9/1999 Abot .................. H01H 9/542
361/13
(Continued)

FOREIGN PATENT DOCUMENTS

DE 14 15 980 A1 1/1969
DE 10 2005 036 777 A1 2/2007
EP 0 806 781 A1 11/1997

OTHER PUBLICATIONS

BTA16-600SW3G on semiconductor TRIAC spec sheet p. 1, Sep. 2009.*
(Continued)

*Primary Examiner* — Bickey Dhakal
*Assistant Examiner* — Charles S Laughlin
(74) *Attorney, Agent, or Firm* — Harness, Dickey & Pierce, PLC

(57) ABSTRACT

A motor starter includes a control unit and a first current path, via which energy can be supplied to a downstream electrical motor. The first current path includes a semiconductor switch and an electromechanical switch element, the semiconductor switch and the switch element being connected in series. In order to provide a cost-effective, safe motor starter, according to an embodiment of the invention the control unit is designed such that, in order to produce an energy supply via the first current path in a first step, it ensures that the voltage currently connected via the switch element, in respect of a previous opening of the switch element, lies below the allowable maximum blocking voltage of the semiconductor switch. Subsequently in a second (Continued)

step, the switch element first closes and then switches the semiconductor switch to be conductive.

17 Claims, 1 Drawing Sheet

(51) Int. Cl.
*F02N 11/08* (2006.01)
*H02P 21/20* (2016.01)

(56) References Cited

U.S. PATENT DOCUMENTS

2002/0093774 A1* 7/2002 Chung .................. H01H 9/542
 361/2
2008/0225457 A1 9/2008 Korrek

OTHER PUBLICATIONS

NPL, ON Semiconducto Spec sheet for Triacs BTA16 series, p. 1, Sep. 2009.*
International Search Report PCT/ISA/210 for International Application No. PCT/EP2012/066462, dated Aug. 19, 2013.
Written Opinion of the International Searching Authority PCT/ISA/237 for International Application No. PCT/EP2012/066462, dated Aug. 19, 2013.
German Office Action from DESN 102012214814.0, dated Aug. 22, 2013.

* cited by examiner

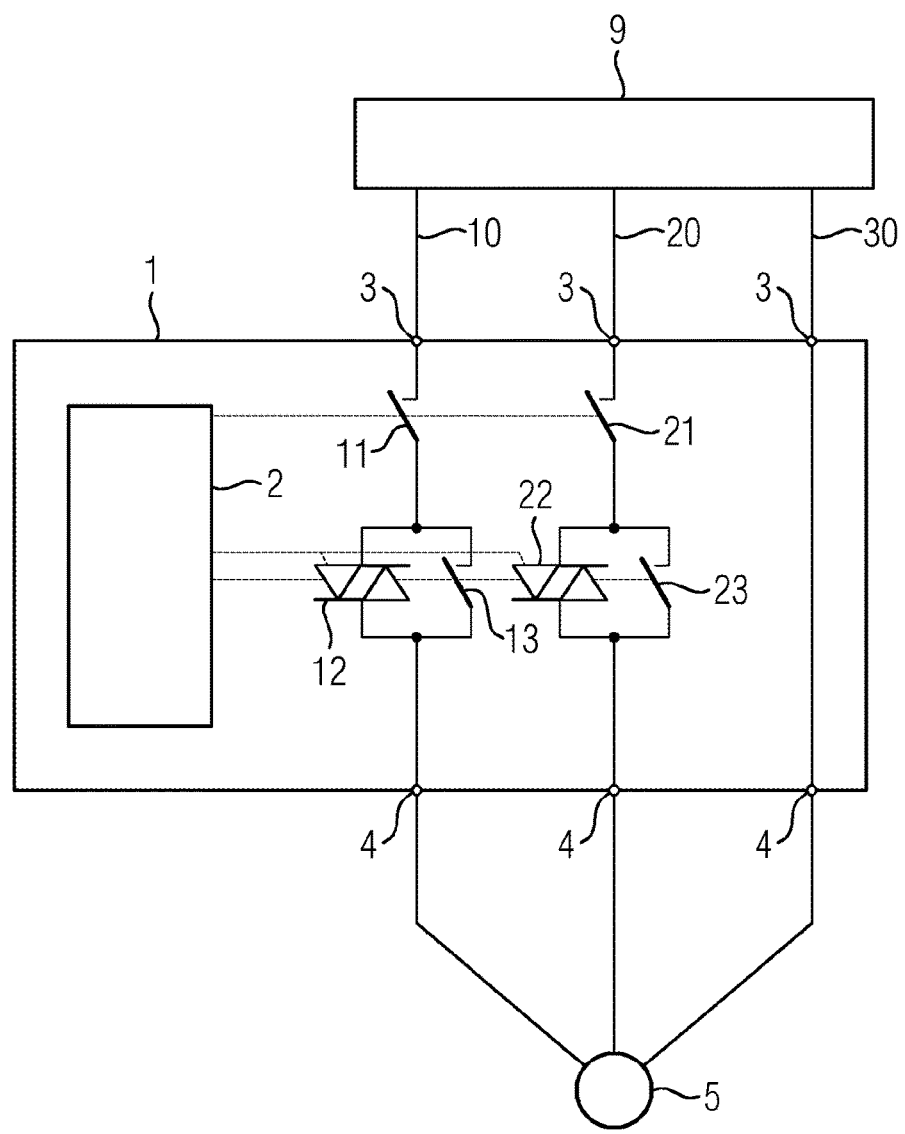

MOTOR STARTER

PRIORITY STATEMENT

This application is the national phase under 35 U.S.C. § 371 of PCT International Application No. PCT/EP2013/066462 which has an International filing date of Aug. 6, 2013, which designated the United States of America, and which claims priority to German patent application no. 102012214814.0 filed Aug. 21, 2012, the entire contents of each of which are hereby incorporated herein by reference.

FIELD

At least one embodiment of the invention generally relates to a motor starter and/or a method for the motor starter. The motor starter according to at least one embodiment of the invention is in particular used in the field of industrial automation technology.

BACKGROUND

The motor starter can be used to control an electric motor downstream of the motor starter. To this end, an energy supply for the electric motor downstream of the motor starter is supplied via the motor starter so that the electric motor is connected to a supply network. The supply network is in particular a low-voltage network of an industrial installation (for example three phases, 400 volts, 50 hertz).

To control the energy supply of the downstream electric motor, the motor starter comprises a control unit and a first current path. A first phase of the supply network is supplied via the first current path to the downstream electric motor. The first current path comprises a semiconductor switch and an electromechanical switch element, wherein the semiconductor switch and the switch element are connected in series and can be controlled by way of the control unit.

When switching three-phase synchronous motors with semiconductor switches, when the electric motor has been switched off by way of a semiconductor switch, the semiconductor switch is located between two voltage sources so that a blocking voltage is applied to the semiconductor switch. The blocking voltage of the semiconductor switch is the electric voltage, which is applied via the semiconductor switch. One voltage source is the supply network. The other voltage source is the voltage induced by the electric motor, which is present for as long as there is still a magnetic field in the electric motor.

Since, on switching off by the motor starter, the speed of the electric motor is lower than its synchronous speed and the speed dies down after the electric motor is switched off, the voltage generated by the electric motor always has a frequency lower than the frequency of the voltage of the supply network. This results in instants of time for the motor starter in which the voltage difference and hence the voltage stress of the semiconductor switch can increase to the total of the two peak voltages. Therefore, the maximum allowable blocking voltage of the semiconductor switch used has to be set correspondingly high. To date, this has been achieved in that the semiconductor switch of a motor starter must have a maximum allowable blocking voltage, which is higher than the maximum voltage that occurs at the semiconductor switch in respect of an allowable system for the motor starter. The necessary maximum allowable blocking voltage for the semiconductor switch of a motor starter is usually calculated as follows:

$$U_{Sperr} \geq U_{Netz} \cdot \sqrt{2} \cdot 2 \cdot T$$

$U_{Sperr}$=Maximum blocking voltage of the semiconductor switch
$U_{Netz}$=Nominal voltage of the supply network
T=Tolerance factor At 500 volts nominal supply network voltage with 10% tolerance (T=1.1), the blocking voltage is 1556 volts. Therefore, usually a semiconductor switch with a maximum allowable blocking voltage of 1600 volts would be used inside a motor starter.

SUMMARY

An embodiment of the present invention provides an inexpensive safe motor starter.

An embodiment is directed to a motor starter, i.e. a motor starter having a control unit and a first current path, via which energy can be supplied to a downstream electric motor, wherein the first current path comprises a semiconductor switch and an electromechanical switch element, wherein the semiconductor switch and the switch element are connected in series, wherein the control unit is designed such that, in order to establish an energy supply via the first current path, it ensures in a first step that the voltage currently applied via the switch element in respect of a previous opening of the switch element is below the maximum allowable blocking voltage of the semiconductor switch and, subsequently in a second step, first closes the switch element and then switches the semiconductor switch to be conductive.

Further, at least one embodiment is directed to a method, i.e. by a method to interrupt an energy supply via a first current path of a motor starter for a electric motor running downstream, wherein the first current path comprises a semiconductor switch and an electromechanical switch element, wherein the semiconductor switch and the switch element are connected in series, wherein to interrupt the energy supplied via the first current path, the control unit of the motor starter switches the semiconductor switch into the non-conductive state and immediately afterward opens the closed switch element.

Further, at least one embodiment is directed to a method, i.e. by a method to establish an energy supply via a first current path of a motor starter for a downstream electric motor, wherein the first current path comprises a semiconductor switch and an electromechanical switch element, wherein the semiconductor switch and the switch element are connected in series, wherein, to establish the energy supply via the first current path, the control unit ensures in a first step that the voltage currently applied via the switch element in respect of a previous opening of the switch element, in particular as claimed in claim 9, is below the maximum allowable blocking voltage of the semiconductor switch and subsequently, in a second step, first closes the switch element and then switches the semiconductor switch to be conductive.

BRIEF DESCRIPTION OF THE DRAWINGS

The following will describe and explain the invention and embodiments of the invention in more detail with reference to the example embodiment shown in the FIGURE.

The FIGURE is a schematic diagram of a motor starter 1.

DETAILED DESCRIPTION OF THE EXAMPLE EMBODIMENTS

An embodiment is directed to a motor starter, i.e. a motor starter having a control unit and a first current path, via which energy can be supplied to a downstream electric motor, wherein the first current path comprises a semiconductor switch and an electromechanical switch element, wherein the semiconductor switch and the switch element are connected in series, wherein the control unit is designed such that, in order to establish an energy supply via the first current path, it ensures in a first step that the voltage currently applied via the switch element in respect of a previous opening of the switch element is below the maximum allowable blocking voltage of the semiconductor switch and, subsequently in a second step, first closes the switch element and then switches the semiconductor switch to be conductive.

Further, at least one embodiment is directed to a method, i.e. by a method to interrupt an energy supply via a first current path of a motor starter for a electric motor running downstream, wherein the first current path comprises a semiconductor switch and an electromechanical switch element, wherein the semiconductor switch and the switch element are connected in series, wherein to interrupt the energy supplied via the first current path, the control unit of the motor starter switches the semiconductor switch into the non-conductive state and immediately afterward opens the closed switch element.

Further, at least one embodiment is directed to a method, i.e. by a method to establish an energy supply via a first current path of a motor starter for a downstream electric motor, wherein the first current path comprises a semiconductor switch and an electromechanical switch element, wherein the semiconductor switch and the switch element are connected in series, wherein, to establish the energy supply via the first current path, the control unit ensures in a first step that the voltage currently applied via the switch element in respect of a previous opening of the switch element, in particular as claimed in claim 9, is below the maximum allowable blocking voltage of the semiconductor switch and subsequently, in a second step, first closes the switch element and then switches the semiconductor switch to be conductive.

Advantageous developments of the invention are disclosed in the dependent claims.

In the interior of the device, the first current path of the motor starter connects the input-side connection point of the motor starter to an output-side connection point of the motor starter. The motor starter is connected via its input-side connection point to the supply network (for example a three-phase network) and by its output-side connection point to the electric motor. Hence, the energy supply of the electric motor is supplied via the first current path. The electric motor is in particular an asynchronous motor.

When producing energy to be supplied via the first current path, the input-side connection points are electrically conductively connected to the output-side connection points of the first current path so that the energy supply for the downstream electric motor takes place via the first current path.

The control unit can control the semiconductor switch and the switch element. In this case, it can switch the semiconductor into an electrically conductive state and a non-electrically conductive state (blocked state) and open (non-electrically conductive state) and close (electrically conductive state) the switch element. An energy supply for an electric motor downstream of the motor starter downstream can be controlled via the first current path by means of the semiconductor switch and the switch element.

The blocking voltage of the semiconductor switch is the electric voltage applied via the semiconductor switch in respect of the current path. The maximal allowable blocking voltage of the semiconductor switch is preferably above the peak value of the allowable nominal voltage of the supply network ($U_{Netz}$) for the motor starter and preferably below the value from $U_{Netz} \cdot \sqrt{2 \cdot 2}$. The maximum blocking voltage of the semiconductor switch is in particular about $U_{Netz} \cdot \sqrt{1 \cdot 1}$.

During a switch off process for an electric motor downstream of the motor starter, the energy supply of the electric motor running downstream supplied via the first current path is interrupted. In this case, in particular the semiconductor switch is switched to the non-conductive state and immediately afterward the switch element opened. During the slowing-down phase of the electric motor, a voltage can be applied via the first current path, which can destroy the semiconductor switch. After a switching-off process of the electric motor, immediate switching back on of the electric motor and the necessary closing of the switch element could result in an impermissible blocking voltage at the semiconductor switch element.

The control unit is, therefore, designed such that, to establish an energy supply via the current path, it ensures in a first step that the voltage currently applied via the switch element in respect of a previous opening of the switch element (in particular due to a switching-off process) is constantly below the maximum allowable blocking voltage of the semiconductor switch. Only when this state is present, does the control unit first close the switch element in a subsequent second step and subsequently switch the semiconductor switch to be conductive. As a result, it is possible to ensure that the semiconductor switch is not destroyed. Furthermore, the graded control in the second step ensures that there is a soft start by means of the semiconductor switch without any impermissible stress on the switch element.

Hence, following a switch-off of the electric motor, the control unit can delay the switching-back-on again until it is ensured according to the first step that the voltage currently applied via the open switch element is constantly below the maximum allowable blocking voltage of the semiconductor switch.

This can, for example, be ensured by comparison with a reference value stored in the control unit. The stored reference value can, for example, be the maximum allowable blocking voltage of the semiconductor switch. A measuring device can be used to determine the blocking voltage applied via the open switch element (the blocking voltage theoretically applied to the semiconductor switch). Only when it has been determined by the measuring device or control unit that the voltage applied via the switch element in respect of the switching-off process of the motor is constantly below the maximum allowable blocking voltage of the semiconductor switch is the switch element closed and then the semiconductor switch switched to be electrically conductive so that the electric motor is started or switched back on again.

The stored reference value can also be a time interval, which after the opening of the switch element, in particular due to the electric motor being switched off, has to expire before the switch element can be closed again. The time delay of the switch-on process is preferably controlled by the control unit. Hence, it is ensured in the first step that the switch element cannot close before the expiry of the time interval. With electric motors, up to 3 kW, the time interval is preferably at least 0.4 seconds, in particular about 0.5 seconds. In the case of larger electric motors, a time interval of up to about 3 seconds can be necessary.

When a running electric motor is switched back on, the switch element remains open until the induced voltage of the electric motor has died back such that the blocking voltage theoretically applied to the semiconductor switch is below the maximum allowable blocking voltage of the semiconductor switch. Only after this is the switch element closed and the electric motor switched on with the semiconductor switch. In this case, it is irrelevant whether the motor is switched to the opposite direction (reversing) or again to the same direction.

An advantage achieved in accordance with at least one embodiment of the invention resides in particular in the fact that a semiconductor switch with a low blocking voltage can be used in the motor starter. This can reduce costs. Despite setting the maximum blocking voltage of the semiconductor switch to about half the values that would otherwise be necessary, it can be ensured that, following a switching-off process of the electric motor and a subsequent command to switch the electric motor back on, there is no damage to the semiconductor switch.

The semiconductor switch is preferably a thyristor, in particular a triac.

In one advantageous embodiment of the invention, the control unit is embodied such that, to interrupt an energy supply supplied via the first current path, it switches the semiconductor switch to the non-conductive state and immediately afterward opens the closed switch element.

The semiconductor switch of the motor starter is in particular embodied such that, on a switching-off process of a electric motor that has been run up to the maximum allowable degree for the motor starter (in nominal operation), the maximum allowable blocking voltage of the semiconductor switch would be exceeded if the switch element connected in series were not additionally automatically opened by the control unit during the switching-off process.

On the interruption of an energy supply supplied via the first current path, the time interval from the switching of the semiconductor switch to the non-conductive state until the opening of the switch element is in particular set such that, after the switching of the semiconductor switch to the non-conductive state, the blocking voltage applied to semiconductor switch cannot exceed the maximum allowable blocking voltage of the semiconductor switch.

The opening of the closed switch element immediately following the switching of the semiconductor switch to the non-conductive state in particular takes place before the blocking voltage applied theoretically (i.e. as long as the switch element would not be opened) applied to the semiconductor switch would exceed the maximum allowable blocking voltage of the semiconductor switch.

On the interruption of an energy supply supplied via the first current path, after the switching of the semiconductor switch to the non-conductive state, the opening of the switch elements preferably takes place within 10 milliseconds or after a half period of the voltage of the supply network. Preferably, the switch element is opened after the current zero of the supply network voltage in the semiconductor switch.

The opening of the switch element immediately after the switching of the semiconductor switch to the non-conductive state is performed automatically and independently by the control unit.

The control unit is preferably embodied such that, to interrupt an energy supply supplied via the first current path, it switches the semiconductor switch to the non-conductive state and subsequently opens the closed switch element before the blocking voltage applied to the semiconductor switch exceeds the maximum allowable blocking voltage of the semiconductor switch, preferably 90 percent of the maximum allowable blocking voltage of the semiconductor switch.

On the interruption of the energy supply supplied via the first current path to a electric motor running downstream, the switch element is opened by the control unit during the run-down phase of the electric motor; i.e. during the period in which a voltage is induced by the electric motor.

Hence, the maximum blocking voltage of the semiconductor switch can be reduced to about half the values that would otherwise be necessary. The fact that, on a switching-off process of the electric motor by means of the motor starter, after the switching of the semiconductor switch to the non-conductive state, the switch element is automatically opened causes the blocking voltage applied within the motor starter to be "diverted" from the semiconductor switch to the switch element. Hence, a semiconductor switch with a much lower blocking voltage than with known motor starters can be used for the motor starter. This can significantly reduce the costs of the motor starter.

In a further advantageous embodiment of the invention, the motor starter comprises a second current path, via which the energy supply of the downstream electric motor can be supplied, wherein the second current path comprises a semiconductor switch and an electromechanical switch element, wherein the semiconductor switch and the switch element of the second current path are connected in series, wherein the control unit is designed such that, to establish an energy supply via the second current path, it ensures in a first step that the voltage currently applied via the switch element of the second current path in respect of a previous opening of the switch element of the second current path, in particular in respect of a switching-off process of the downstream electric motor, is constantly below the maximum allowable blocking voltage of the semiconductor switch of the second current path and subsequently, in a second step, first closes the switch element of the second current path and then switches the semiconductor switch of the second current path to be conductive and/or is designed such that, to interrupt an energy supply supplied via the second current path, it switches the semiconductor switch of the second current path to the non-conductive state and immediately afterward opens the closed switch element of the second current path. The immediately subsequent opening of the switch element of the second current path takes place before the blocking voltage applied to the semiconductor switch of the second current path exceeds the maximum allowable blocking voltage of the semiconductor switch of the second current path.

The semiconductor switch of the second current path (in particular in respect of its maximum blocking voltage) is preferably embodied similarly to the semiconductor switch of the first current path. The control of the semiconductor switch and the switch element of the second current path by the control unit also preferably takes place similarly to the control of the semiconductor switch and the switch element of the first current path by the control unit.

In a further advantageous embodiment of the invention, the motor starter comprises a third current path via which the energy supply to the downstream electric motor can take place, wherein the third current path comprises a semiconductor switch and an electromechanical switch element, wherein the semiconductor switch and the switch element of the third current path are connected in series, wherein the control unit is designed such that, to establish an energy supply via the third current path, it ensures in a first step that the voltage currently applied via the switch element of the third current path in respect of a previous opening of the switch element of the third current path, in particular in respect of a switching-off process of the downstream electric motor, is constantly below the maximum allowable blocking voltage of the semiconductor switch of the third current path and subsequently, in a second step, first closes the switch element of the third current path and then switches the semiconductor switch of the third current path to be conductive and/or is designed such that, to interrupt the energy supply supplied via the third current path, switches the semiconductor switch of the third current path to the non-conductive state and immediately afterward opens the closed switch element of the third current path. The immediately subsequent opening of the switch element of the third current path takes place before the blocking voltage applied to semiconductor switch of the third current path exceeds the maximum allowable blocking voltage of the semiconductor switch of the third current path.

The semiconductor switch of the third current path (in particular in respect of its maximum blocking voltage) is preferably embodied similarly to the semiconductor switch of the first current path. The control of the semiconductor switch and the switch element of the third current path by the control unit is also preferably performed similarly to the control of the semiconductor switch and the switch element of the first current path by the control unit. The switch element of the third current path is in particular arranged between the connection on the input side and the semiconductor switch of the third current path.

In a further advantageous embodiment of the invention, the control unit is embodied such that, to establish an energy supply via the current path, it ensures in a first step that the voltage currently applied via the switch element in respect of a previous switching of the semiconductor switch to the non-conductive state and an immediately subsequent opening of the switch element constantly is below the maximum allowable blocking voltage of the semiconductor switch and subsequently, in a second step, first closes the switch element and then switches the semiconductor switch to be conductive.

When establishing an energy supply supplied via the first current path, the input-side connection points are electrically conductively connected to the output-side connection points of the first current path so that the energy supply for the downstream electric motor is supplied via the first current path.

Following a switching-off process and a immediately subsequent switch-on process, through the running motor a voltage can be applied via the motor starter, in particular via the open switch element, which is above the maximum allowable blocking voltage of the semiconductor switch.

In a first step, therefore, before controlling the switch element and the semiconductor switch, the control unit ensures that the voltage currently applied via the open switch element is not above the maximum allowable blocking voltage of the semiconductor. In the case of the immediate closing of the switch element, the voltage currently supplied via the switch element would be applied to the semiconductor switch as blocking voltage.

Therefore, after the motor has been switched off, the control unit can delay the reswitching-on of a running motor until it has been ensured according to the first step that the voltage currently applied via the open switch element in respect of the previous switching of the semiconductor switch to the non-conductive state and the immediately subsequent opening of the switch element is constantly below the maximum allowable blocking voltage of the semiconductor switch.

This can be ensured, for example, by comparison with a reference value stored in the control unit. The stored reference value can, for example, be the maximum allowable blocking voltage of the semiconductor switch. A measuring device can be used to determine the blocking voltage applied via the open switch element (the blocking voltage theoretically applied to the semiconductor switch). Only when the measuring device or control unit has established that the voltage applied via the switch element in respect of the switching-off process of the motor is constantly below the maximum allowable blocking voltage of the semiconductor switch is the switch element first closed and then the semiconductor switch switched to be electrically conductive so that the electric motor is started or restarted.

The stored reference value can also be a time interval, which, following the switching-off of the electric motor, in particular following the switching to be non-conductive of the semiconductor switch in this respect or the opening of the switch element, has to expire until the switch element can be closed again. The time delay of the switch-on process is preferably controlled by the control unit. Hence, in the first step, it is ensured that the closing of the switch element cannot take place before the expiry of the time interval. With electric motors, up to 3 kW the time interval is preferably at least 0.4 seconds, in particular about 0.5 seconds. With larger electric motors, a time interval of up to about 3 seconds may be necessary.

Hence, when a running electric motor is switched back on, the semiconductor switch stays in the non-conductive state until the induced voltage of the electric motor has died down such that the blocking voltage theoretically applied to the semiconductor switch is permanently below the maximum allowable blocking voltage of the semiconductor switch. Only then is the switch element closed and the electric motor switched on with the semiconductor switch. In this case, it is then irrelevant whether the motor is switched to the opposite direction (reversing) or again to the same direction.

In a further advantageous embodiment of the invention, the current path comprises a bridging switch element parallel to the semiconductor switch. The semiconductor switch of the first, second and/or third current paths can hence in each case be bridged by way of a bridging switch element.

When the downstream electric motor has been switched on by way of the semiconductor switch, the semiconductor switch can be bridged by way of the bridging switch element and subsequently changed to the non-conductive state. The energy supply via the current path now takes place via the bridging switch element. This can reduce the power loss and negative temperature development, which occurs with an energy supply via the semiconductor switch.

The first, second and/or third electromechanical switch element and the bridging switch element is preferably a relay or a contactor.

The voltage currently applied via the switch element is in particular the voltage which is currently applied via the input-side and output-side connection points of the current path of the switch element.

The voltage is constantly below the maximum allowable blocking voltage of the semiconductor switch if it is ensured that, in respect of the switching-off process of the electric motor, the voltage at the switch element does not exceed the maximum allowable blocking voltage of the semiconductor switch.

The FIGURE is a schematic diagram of a motor starter 1, in which its three input-side connection points 3 are connected to a supply network 9 and its three output-side connection points 4 are connected to an electric motor 5. The consumer 5 is an asynchronous motor. The supply network 9 is a three-phase alternating current network of an industrial low-voltage switchboard.

A first phase 10 of the supply network 9 is connected to the input-side connection point 3 by means of a line and supplied via a first current path of the motor starter 1 in the interior of the device to the output-side connection point 4 and subsequently by means of a further line to the electric motor 5. In the interior of the device, the first current path of the motor starter 1 connects the input-side connection point 3 of the motor starter 1 to the output-side connection point 4 of the motor starter 1. The first current path comprises an electromechanical switch element 11, a semiconductor switch 12, in particular a triac, and a bridging switch element 13. The electromechanical switch element 11 is connected in series to the parallel connection of the semiconductor switch 12 by the bridging switch element 13. Consequently, the first phase 10 of the supply network 9 is supplied to the electric motor 5 via the first current path.

A second phase 20 of the supply network 9 is connected by means of a line to the input-side connection point 3 and is supplied in the interior of the device via a second current path of the motor starter 1 to the output-side connection point 4 and subsequently, by means of a further line, to the electric motor 5. In the interior of the device, the second current path of the motor starter 1 connects the input-side connection point 3 of the motor starter 1 to the output-side connection point 4 of the motor starter 1. The second current path comprises an electromechanical switch element 21, a semiconductor switch 22, in particular a triac and a bridging switch element 23. The electromechanical switch element 21 is connected in series to the parallel connection of the semiconductor switch 22 by the bridging switch element 23. Consequently, the second phase 20 of the supply network 9 is supplied to the electric motor 5 via the second current path.

A third phase 30 of the supply network 9 is connected by way of a line to the input-side connection point 3 and is supplied via a third current path of the motor starter 1 in the interior of the device to the output-side connection point 4 and subsequently by means of a further line to the electric motor 5. In the interior of the device, the third current path of the motor starter 1 connects the input-side connection point 3 of the motor starter 1 to the output-side connection point 4 of the motor starter 1. The motor starter 1 depicted is a 2-phased controlled motor starter 1 so that the third current path form a fixed continuous electric contacting in the interior of the device between the input-side and output-side connection point 3, 4. However, it is also conceivable for the third current path to be embodied similarly to the first and/or second current path of the motor starter 1.

The motor starter 1 comprises a control unit 2 by which the control of the switch elements 11, 21 the semiconductor switches 12, 22 and the bridging switch element 13, 23 takes place. The control unit 2 can also receive control signals (switching the electric motor 5 on/off) for the motor starter 1 and in response output the corresponding switching command to the semiconductor switches 12, 22, switch elements 11, 21 and the bridging switch elements 13,23.

The semiconductor switches 12, 22 of the motor starter 1 are embodied such that the maximum allowable blocking voltage of the semiconductor switches 12, 22 are above the peak value of the nominal voltage of the supply network ($U_{Netz}$) and below the value from $U_{Netz} \cdot \sqrt{2} \cdot 2$. The maximum blocking voltage of the semiconductor switch is in particular about $U_{Netz} \cdot \sqrt{2} \cdot 1.1$.

If a running electric motor 5 is in nominal mode, within the motor starter 1, the switch elements 11, 21 are closed, the semiconductor switches 12, 22 are switched to be non-electrically conductive and the bridging switch elements 13, 23 are closed. If the motor starter 1 now receives a signal to switch off the electric motor 5, the motor starter 1 interrupts the energy supply taking place via the first and second current path for the electric motor 5. To this end, first, the semiconductor switches 12, 22 are switched to be electrically conductive by the control unit 2 and subsequently the bridging switch element 13, 23 opened by the control unit 2.

Subsequently, the semiconductor switches 12, 22 are switched by the control unit 2 to the non-conductive state so that the energy supply via the first and second current path to the electric motor 5 is interrupted. Immediately subsequently to semiconductor switches 12, 22 being switched to non-conductive, the switch element 11, 21 is automatically opened by the control unit 2. As a result, the potential difference between the voltage of the supply network 9 and the induced voltage of the electric motor 5 is moved from the semiconductor switches 12, 22 to the opened switch elements 11, 21.

The semiconductor switches 12, 22 of the motor starter 5 can therefore be embodied such that the maximum allowable blocking voltage of the semiconductor switches 12, 22 is below the value from $U_{Netz} \cdot \sqrt{2} \cdot 2$. The opening of the switch elements 11, 21 after the semiconductor switches 12, 22 are switched to being non-conductive in particular takes place within 0.5 periods of the voltage of the supply network after the switching of the semiconductor switches 12, 22 to the non-conductive state.

It is also conceivable for the opening of the switch elements 11, 21 after the semiconductor switches 12, 22 have been switched to be non-conductive to take place within a firmly established time so that it is ensured that the blocking voltage currently applied to the semiconductor switches 12, 22 does not exceed the maximum allowable blocking voltage of the semiconductor switches 12, 22. The opening of the closed switch element 11, 21 immediately subsequent to the switching the semiconductor switches 12, 22 to the non-conductive state in particular takes place before the blocking voltage theoretically applied to the respective semiconductor switches 12, 22 would exceed the maximum allowable blocking voltage of the semiconductor switch 12, 22. The necessary control of the switching processes is performed by means of the control unit 2.

If, immediately after the switching-off of the running electric motor 5, the motor starter 1 receives a signal for the switching-on of the electric motor 5, the motor starter 1 establishes an energy supply for the downstream electric motor 5 via the first and second current path. In this case, there is at first still a running electric motor 5 switched off by the motor starter 1. In this case, the switch elements 11, 21 in the motor starter 1 are opened, the semiconductor switches 12, 22 are switched to be non-electrically conductive and the bridging switch elements 13, 23 are open. In the case of the switching-on of the electric motors 5 (establishment of the energy supply via the current paths, the control unit 2 ensures in a first step that the voltage currently applied via the open switch element 12 is constantly below the maximum allowable blocking voltage of the semiconductor switches 12, 22. Only after this, does the control unit 2 in a second step first close the switch elements 11, 21 and then switches the semiconductor switches 12, 22 to the conductive state.

In the first step, it is ensured before the closing of the switch elements 11, 12 that the voltage currently applied via the switch elements 11, 21, in respect of a previous switching-off of the electric motor (the semiconductor switches 12, 22 were switched to the non-conductive state and immediately subsequently the switch elements 11, 21 opened) is permanently (i.e. in respect of the switching-off process of the electric motor) below the maximum allowable blocking voltage of the semiconductor switches 12, 22. In this exemplary embodiment, this takes place in that, following an opening of the switch elements 11, 21 a time stored in the control unit 2 has to expire.

The time to be expired ensures that no blocking voltage can be applied to the semiconductor switches 12, 22 which would exceed their maximum allowable blocking voltage.

Only after this time, does the electric motor 5 become active via the closing of the switch elements 11, 21 and subsequent switching of the semiconductor switches 12, 22 to the electrically conductive state.

Hence, the switch element 11, 21 connected in series to the semiconductor switches 12, 22 causes the respective semiconductor switch 12, 22 to be isolated until the induced voltage in the electric motor 5 has died down to below the allowable value of the blocking voltage for the semiconductor switches 12, 22.

If the electric motor 5 is to be switched back on again, the switch elements 11, 21 are only closed after the expiry of the necessary "isolation time". Hence, it is only at this time that the respective semiconductor switch 12, 22 takes on the blocking voltage obtained from the network voltage and the induced voltage of the electric motor 5. Consequently, the semiconductor switches 12, 22 are isolated by the switch elements 11, 21 from the voltage stress until the temporally limited phase in which there would be overstressing for the semiconductor switches 12, 22, has expired.

The advantage consists in the fact that the voltage endurance for the semiconductor switches 12, 22 can be set to about the half the values that would otherwise be necessary. This means that, for the example cited in the introduction to the description, instead of a necessary maximum blocking voltage of 1600 V for the respective semiconductor switch 12, 22, a maximum blocking voltage of 800 V suffices for the respective semiconductor switch 12, 22. This saves costs. Hence, it is in particular possible with low motor powers of about 3 kW, to use simple inexpensive thyristors and triacs.

In this depiction, the switch elements 11, 21 can be used to switch the semiconductor switches 12, 22 to the non-conductive state on the network side of the motor starter 1. However, the switch elements 11, 21 could also be arranged on the load side of the motor starter 1.

The invention claimed is:

1. A motor starter comprising:
   a control unit; and
   a first semiconductor switch and a first electromechanical switch element connected in series, forming a first current path via which energy is suppliable from an electric network with a network voltage to a downstream electric motor,
   wherein the control unit is configured to
      supply energy to the downstream electric motor,
      discontinue energy to the downstream electric motor,
      close the first electromechanical switch element after the discontinuing and only after a time period in which a blocking voltage obtained from the network voltage and a voltage induced by the downstream electric motor is below a maximum allowable blocking voltage of the first semiconductor switch, and
      switch the first semiconductor switch to be conductive after closing the first electromechanical switch element.

2. The motor starter of claim 1, wherein the control unit is further configured to interrupt the energy supply via the first current path, to switch the semiconductor switch into a non-conductive state and, immediately afterward, to open the closed switch element.

3. The motor starter of claim 1, further comprising
   a second semiconductor switch and a second electromechanical switch element connected in series, forming a second current path via which energy is suppliable to the downstream electric motor, and
   wherein the control unit is further configured to
      close the second switch element after the discontinuing and after a voltage induced by the downstream motor is below a maximum allowable blocking voltage of the semiconductor switch of the second current path, to
      first close the switch element of the second current path and then switch the semiconductor switch of the second current path to be conductive.

4. The motor starter of claim 3, wherein the control unit is further configured to
   interrupt energy supplied via the second current path,
   switch the second semiconductor switch of the second current path to a non-conductive state and immediately afterward to open the closed second switch element of the second current path.

5. The motor starter of claim 3, further comprising
   a third semiconductor switch and a third electromechanical switch element connected in series, forming a third current path, via which the downstream electric motor is suppliable with energy, and wherein the control unit is further configured to
   close the third switch element after the discontinuing and after a voltage induced by the downstream motor is below a maximum allowable blocking voltage of the third semiconductor switch of the third current path, and
   switch the semiconductor switch of the third current path to be conductive after closing the third switch element.

6. The motor starter of claim 5, wherein the control unit is further configured to
   interrupt energy supplied via the third current path,
   switch the semiconductor switch of the third current path to a non-conductive state and immediately afterward, to open the closed switch element of the third current path.

7. The motor starter of claim 1, wherein the maximum allowable blocking voltage of the first semiconductor switch is above a peak value of an allowable nominal voltage of the supply network ($U_{Netz}$) for the motor starter and below the value from $U_{Netz} \cdot \sqrt{2} \cdot 2$.

8. The motor starter of claim 1, wherein the first current path comprises a bridging switch element switched in parallel to the first semiconductor switch.

9. A method to establish an energy supply via a first current path of a motor starter for a downstream electric motor, the first current path including a semiconductor switch and an electromechanical switch element connected in series, the method comprising:
   supplying energy to the downstream motor, discontinuing energy to the downstream motor, closing the switch element after the discontinuing and after a voltage induced by the downstream motor is below a maximum allowable blocking voltage of the semiconductor switch, and subsequently closing the switch element, and then switching the semiconductor switch to be conductive.

10. The motor starter of claim 5, wherein the control unit is further configured to close the third switch element after the discontinuing and after a voltage induced by the downstream motor is below the maximum allowable blocking voltage of the second semiconductor switch of the second current path, to first close the switch element of the second current path and then switch the second semiconductor switch of the second current path to be conductive.

11. The motor starter of claim 10, wherein the control unit is further configured to interrupt energy supplied via the second current path, to switch the semiconductor switch of the second current path to a non-conductive state and immediately afterward to open the closed switch element of the second current path.

12. The motor starter of claim 2, wherein the maximum allowable blocking voltage of the semiconductor switch is above a peak value of an allowable nominal voltage of the supply network ($U_{Netz}$) for the motor starter and below the value from $U_{Netz} \cdot \sqrt{2} \cdot 2$.

13. The motor starter of claim 2, wherein the first current path comprises a bridging switch element switched in parallel to the semiconductor switch of the first current path.

14. The motor starter of claim 3, wherein the maximum allowable blocking voltage of the semiconductor switch is above a peak value of an allowable nominal voltage of the supply network ($U_{Netz}$) for the motor starter and below the value from $U_{Netz} \cdot \sqrt{2} \cdot 2$.

15. The motor starter of claim 3, wherein the second current path comprises a bridging switch element switched in parallel to the semiconductor switch of the second current path.

16. The motor starter of claim 5, wherein the maximum allowable blocking voltage of the semiconductor switch is above a peak value of an allowable nominal voltage of the supply network ($U_{Netz}$) for the motor starter and below the value from $U_{Netz} \cdot \sqrt{2} \cdot 2$.

17. The motor starter of claim 5, wherein the third current path comprises a bridging switch element switched in parallel to the semiconductor switch of the third current path.

* * * * *